United States Patent [19]
Whiteside

[11] Patent Number: 5,287,506
[45] Date of Patent: Feb. 15, 1994

[54] TOKEN RING NETWORK PROTOCOL ANALYZER

[75] Inventor: Charles H. Whiteside, Colorado Springs, Colo.

[73] Assignee: Hewlett-Packard Company, Palo Alto, Calif.

[21] Appl. No.: 777,987

[22] Filed: Oct. 17, 1991

[51] Int. Cl.$^5$ ............................................. G06F 11/00
[52] U.S. Cl. ................... 395/650; 364/240.8; 364/242.95; 364/265
[58] Field of Search ................. 370/16, 85.8, 60, 85.7, 370/85.5; 364/825; 324/533; 395/650, 700

[56] References Cited

U.S. PATENT DOCUMENTS

| | | | |
|---|---|---|---|
| 4,831,518 | 5/1989 | Yu et al. | 395/650 |
| 4,841,523 | 6/1989 | Roffinella et al. | 370/85.7 |
| 4,984,233 | 1/1991 | Nakayashiki et al. | 370/16 |
| 5,012,468 | 4/1991 | Siegel et al. | 370/85.5 |
| 5,128,619 | 6/1992 | Bjork et al. | 324/533 |
| 5,130,983 | 6/1992 | Heffner, III | 370/85.8 |
| 5,132,926 | 6/1992 | MacEachern et al. | 364/825 |
| 5,136,580 | 8/1992 | Videlock et al. | 370/60 |
| 5,155,726 | 10/1992 | Spinney et al. | 370/85.5 |
| 5,179,341 | 1/1993 | Whiteside | 324/523 |
| 5,189,663 | 2/1993 | Williams | 370/17 |

OTHER PUBLICATIONS

PC Magazine, The Perfect PC '93, Jul. 1993, pp. 335-358.
Token Ring Access Method and Physical Layer Specifications I.E.E.E. Std. 802.5-1989; pp. 81-84.
Texas Instruments TMS380 Second-Generation Token Ring User's Guide-1990; pp. 2-60 through 2-63, 4-8 through 4-13, pp. 4-40.

Primary Examiner—Kevin A. Kriess
Assistant Examiner—Kevin Spivak
Attorney, Agent, or Firm—Augustus W. Winfield

[57] ABSTRACT

A method and apparatus for inserting a computer network protocol analyzer into a Token Ring network. Commercial integrated circuits are used to initiate a standard protocol test and synchronization sequence and to actuate an insertion relay in a network coupling unit. After actuation of the insertion relay, incoming network data is switched onto outgoing network data lines, bypassing the commercial protocol circuitry. As a result, the analyzer can be inserted into a Token Ring even when there are network problems which would prohibit insertion under normal protocol.

2 Claims, 4 Drawing Sheets

TOKEN RING NETWORK PROTOCOL ANALYZER

FIELD OF INVENTION

This invention generally relates to computer network systems and more particularly, relates to instrumentation for monitoring activity on a Token Ring network.

BACKGROUND OF THE INVENTION

Modern computer systems are often interconnected by a network. Networks use a variety of interconnection topologies and interconnection hardware technology. For each hardware technology, there may be numerous protocols for data transmission. One common network standard for topology, hardware and data protocol is the Token Ring. The word "token" refers to the method for collision avoidance. A token is a few bytes of data which are circulated from one device on the network to the next. A device can transmit data on the network only when it has the token. In a Token Ring network, all devices on the network are topologically connected into a logical ring.

In order for a device to join a Token Ring as a normal node, it must first complete a series of self tests, cable tests, and network status tests. After joining the network, the device must follow standard protocols for receiving and transmitting data. There are commercially available integrated circuits which facilitate the preliminary tests and which follow the normal protocol conventions. For example, the TMS38053 and TMS380C16 chips from Texas Instruments may be used to implement preliminary tests and the normal protocol. Commercial integrated circuits such as these are designed to automatically deny access to the network if problems exist.

A protocol analyzer is a device for monitoring data on a network for troubleshooting of network faults and for characterizing network usage and performance through statistical analysis. A protocol analyzer may also transmit messages to test system responses, identify active stations, or simulate heavily loaded network conditions. An example of a commercially available protocol analyzer is the Hewlett Packard 4980.

A protocol analyzer on a Token Ring network must meet all the standard requirements of a Token Ring compatible device. This means that the analyzer must receive and re-transmit frames of data at network speed. In addition, the analyzer must meet the protocol conventions described above for joining the network and for transmitting data. For cost effective design, use of commercially available integrated circuits is desirable. However, for troubleshooting effectiveness, the analyzer needs a way to circumvent the normal connection protocol imposed by commercially available circuits and join the ring even when problems exist on the ring.

The following information provides additional technical background to facilitate later discussion of the present invention. The Token Ring network was developed by International Business Machines (IBM) in 1969. Today, the Institute of Electrical and Electronic Engineers (IEEE) and the American National Standards Institute (ANSI) maintain standards for portions of the Token Ring network (IEEE/ANSI 802.5).

FIG. 1 is a simplified depiction of a Token Ring network as specified by IEEE 802.5. In FIG. 1, four computers (102, 104, 106, 108) are connected by a logical ring. As depicted in FIG. 1, network signals travel sequentially from one computer to the next. Each computer connected to the ring receives serial network data and either retransmits the received data or transmits new data. Even though the computers are logically connected in a ring, they physically appear to be connected as a "star" configuration because all network cables go through a central wiring concentrator 110, also referred to as a medium access control unit (MAU).

Continuing with FIG. 1, each computer connects to the main network trunk through a trunk coupling unit (112, 114, 116, 118). Detail 120 illustrates additional features of a typical trunk coupling unit (112, 114, 116, 118). As detail 120 illustrates, all signal cables (122, 124, 126, 128) are differential signal pairs. Currently, signal cables are typically shielded twisted pairs but could be coaxial cable or fiber-optic cable.

Continuing with FIG. 1, detail 120, each trunk coupling unit (112, 114, 116, 118) contains a latching insertion relay 130 with four double-pole double-throw switches. Signals between the network trunk and the computer are actually transformer coupled but to simplify the illustration, the transformer coupling has not been illustrated. The insertion relay 130 is actuated by a coil 132 connected between one line from the transmit line pair 126 from the computer and one line from the receive line pair 124 to the computer. A DC voltage on the insertion relay coil 132 causes the insertion relay 130 to switch from a quiescent bypass configuration (detail 134) to a coupled configuration (detail 120).

In the insertion relay quiescent bypass configuration (FIG. 1, detail 134), network trunk signals 136, 142 bypass the computer cable line pairs 138, 140. In addition, in the bypass configuration (detail 134), the computer transmit line pair 140 is connected to the computer receive line pair 138 so that computer generated signals loop back to the computer. This is used by the computer to test the computer signal cables 138, 140 before connecting to the network.

In the insertion relay coupled configuration (FIG. 1, detail 120), signals from the upstream network cable 122 are coupled to the computer receive line pair 124 and the computer transmit line pair 126 is coupled to the network cable 128 leading downstream to the next computer (transformer coupling not illustrated).

FIG. 2 is a simplified flow chart illustrating a typical test sequence which a computer should implement before connecting to a Token Ring. The computer network adapter will typically have a phase-locked-loop circuit to generate a clock which must be synchronized to incoming data before digital data can be extracted from analog network signals. Starting at FIG. 2, step 202, a computer will typically implement a preliminary synchronization (204) by sending test data through the medium access control unit (MAU) (FIG. 1, 110) which will have an insertion relay (FIG. 1, 132) in the quiescent bypass configuration (FIG. 1, detail 134). In step 206 the computer will compare received data extracted using the phase-locked-loop clock to the data which was generated in step 202. If there are no data errors, the insertion relay (FIG. 1, 132) is closed (FIG. 2, step 208) to permit network signals to pass through the computer. When a DC voltage is impressed across the computer signal lines to close the insertion relay, a simultaneous cable impedance test is activated (FIG. 2, test 210). Although illustrated as a discrete test, this is typically a continuous test, generating an interrupt to the computer if a cable fault ever occurs. In FIG. 2, block 212, the phase-locked-loop then synchronizes to incoming network data. Data accuracy is checked again (step 214) using checksums inherent in network data. In addition, network messages are analyzed to check for various network fault conditions (test 216).

Continuing with FIG. 2, if network data is being received error free, and no network fault conditions exist, a test frame is transmitted with the ID of the transmitting computer (step 218). Only the transmitting computer should respond to that ID (test 220). If the transmitted test frame is successfully passed from computer to computer and returned error free (test 222) back to the transmitting computer, then the computer has successfully inserted into the ring (step 224).

If a computer in a Token Ring network detects a hard failure, the detecting computer sends a special data frame (called a "beacon") to all other computers on the ring. The beacon frame suspends normal operation and invokes a special problem determination mode (called "beaconing"). As a part of routine Token Ring housekeeping, each computer on the ring knows the identity of its upstream neighbor. During the beaconing mode, the computer detecting a problem and its upstream neighbor execute a series of tests to attempt to isolate the problem to one of those two computers or the cabling in between. Normally, a computer which is not already inserted into the ring cannot be inserted during beaconing. However, this is an example of a situation where it is desirable to ignore normal protocol and insert a network analyzer to passively observe the troubleshooting messages and to do so without disturbing the existing sequence of neighbors.

The previous discussion leaves out considerable detail for simplicity. The point being illustrated is that insertion into a Token Ring is a complex process and is usually handled by specialized commercial integrated circuits. A network protocol analyzer needs be able to be inserted into a network to diagnose problems which might cause failure of the tests illustrated by FIG. 2, tests 214, 216, 220, and 222. A network analyzer needs to pass self test 206 and cable test 210 and then insert into the Token Ring regardless of other network problems (e.g. beaconing).

SUMMARY OF THE INVENTION

The present invention provides a Token Ring protocol analyzer which is compatible with the normal connection protocol but which can also circumvent the normal connection protocol to perform troubleshooting. The present invention uses commercially available integrated circuits for the normal connection protocol. However, the present invention uses the commercial integrated circuits in a novel manner along with additional circuitry to achieve the troubleshooting mode. The resulting analyzer can switch between one mode which meets IEEE/ANSI 802.5 protocol standards and another mode which allows the analyzer to forcibly insert into a network during a fault condition and to passively monitor all data circulating on a ring.

DETAILED DESCRIPTION OF THE PREFERRED EMBODIMENT OF THE INVENTION

Figure 3:
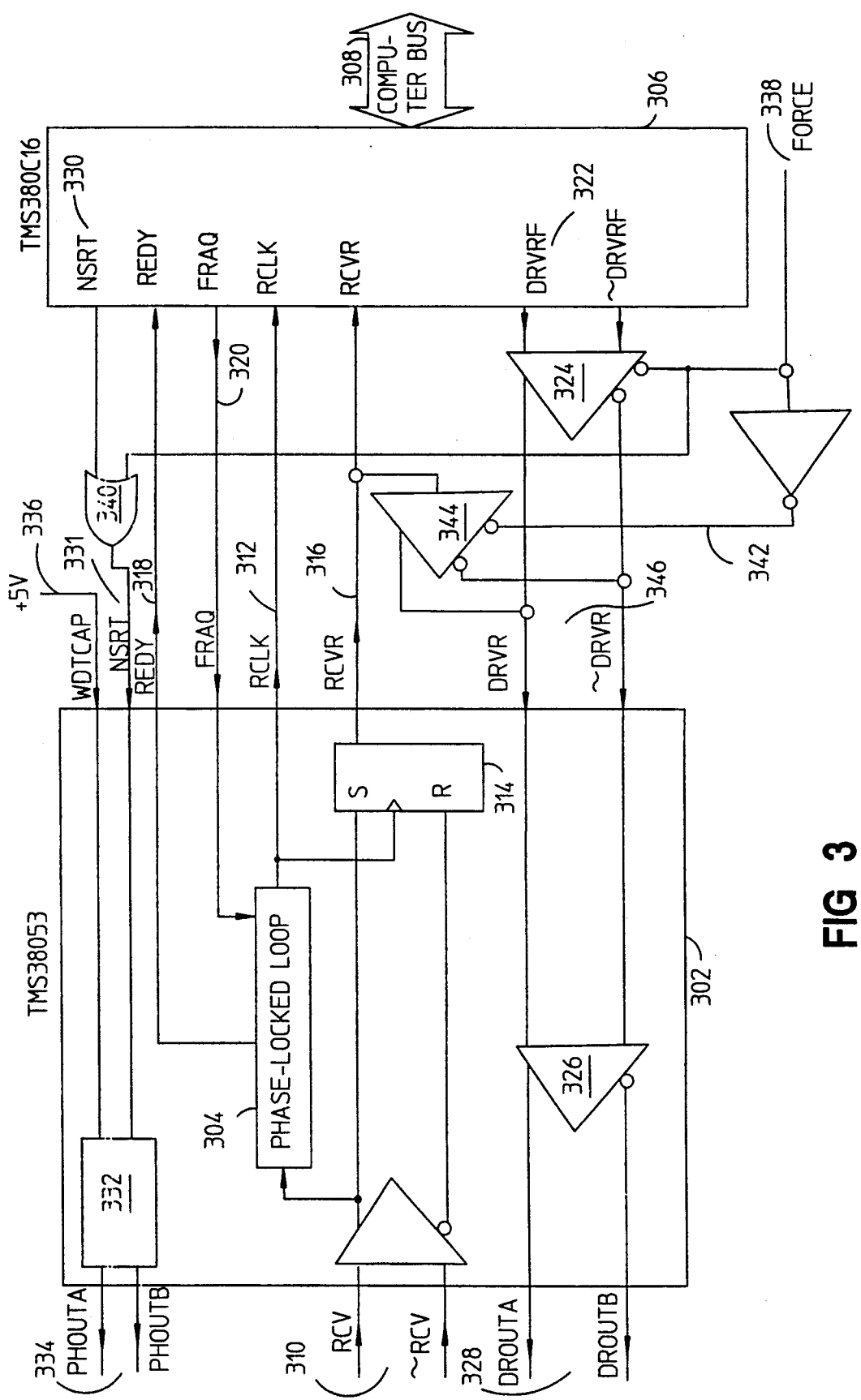
FIG. 3 is a block diagram schematic of circuitry used in the preferred embodiment of the present invention.

FIG. 3 is a simplified schematic illustrating a few of the elements in a normal interface to a Token Ring network, and modifications required to implement the preferred embodiment of the present invention. Device 302 represents a Texas Instruments TMS38053 ring interface circuit. The TMS38053 (302) contains the analog circuitry for a Token Ring connection, including phase-locked-loop circuitry (304) and cable impedance testing circuitry (not illustrated). Device 306 represents a Texas Instruments TMS380C16 Token Ring adapter which is a digital companion part to the TMS38053 (302). The TMS380C16 (306) includes a processor (not illustrated), memory interface (not illustrated), a protocol handler state machine (not illustrated) and interfacing to a host microprocessor bus 308.

As illustrated in FIG. 3, signals from the network are received as a differential pair of analog signals RCV and ~RCV (310). A phase-locked-loop (304) extracts a clock signal RCLK (312) which is used to clock a flip-flop 314 to extract a digital data signal RCVR (316). The phase-locked-loop (304) is synchronized in 2 steps. First, the phase-locked-loop (304) is locked onto the incoming signal frequency. When frequency locking is achieved, the phase-locked-loop (304) sends signal REDY (318) to the TMS380C16 (306) state machine circuitry, which in turn sends signal FRAQ (320) back to the phase-locked-loop (304) to enable a phase synchronization mode.

In a normal protocol mode, the incoming digital signal RCVR (316) is repeated by the TMS380C-16 (306) as a pair of outgoing complementary digital signals DRVRF and ~DRVRF (322) which pass through a first tri-state buffer (324), through a differential analog driver amplifier 326, and out to the ring as differential analog output signals DROUTA and DROUTB (328).

Figure 1:
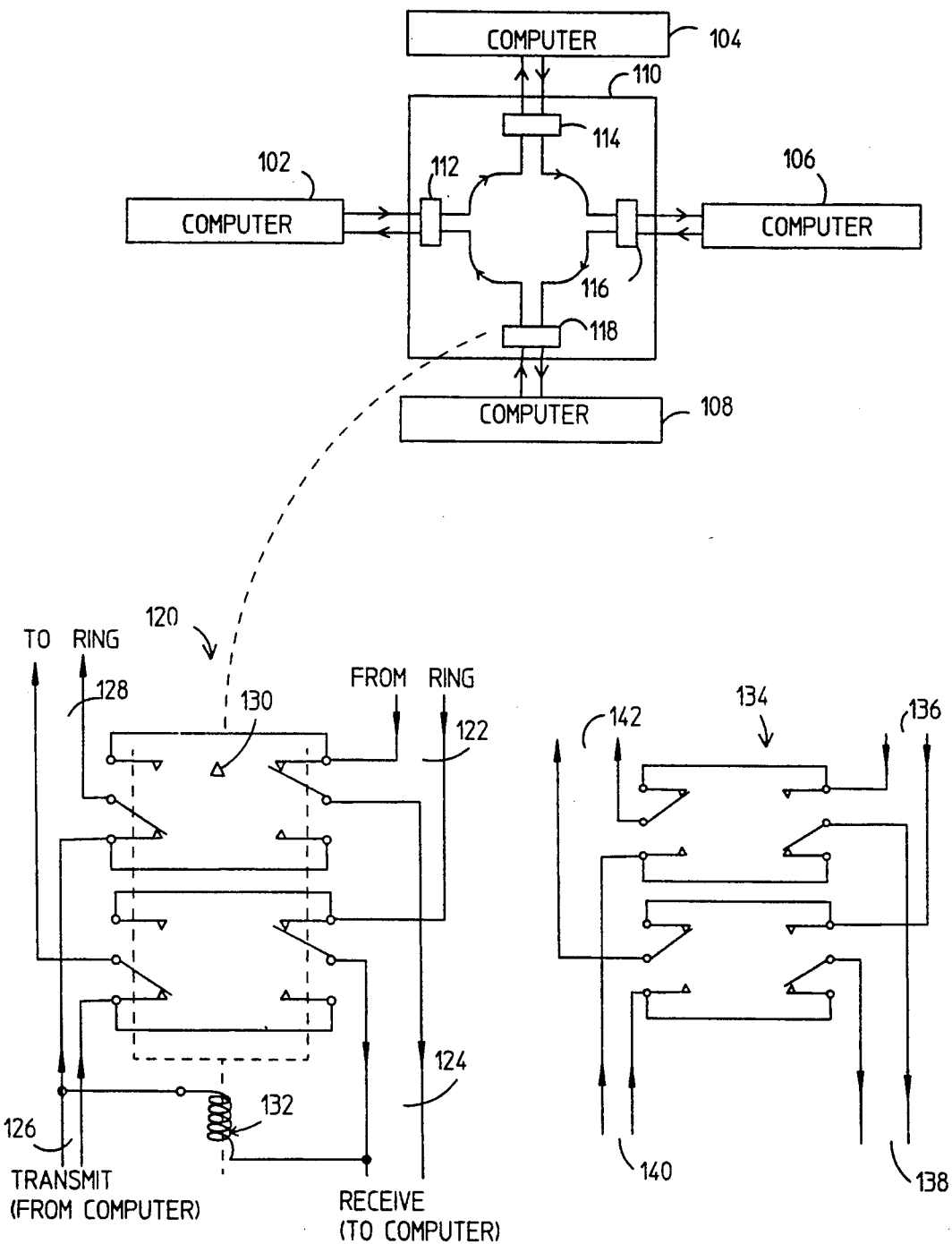
FIG. 1 is a prior art block diagram of a Token Ring network.

In a normal protocol mode, the NSRT output signal (330) from the TMS380C16 (306) is sent to a corresponding NSRT input signal (331) on the TMS38053 (302). An analog device 332 in the TMS38053 (302) generates the DC voltages PHOUTA and PHOUTB (334) which connect to the computer signal cables (not illustrated in FIG. 3) to actuate the insertion relay (FIG. 1, 132). The analog device 332 also contains cable impedance measurement circuitry (not illustrated). In addition, the analog device 332 contains an analog timer (not illustrated), so that in a normal protocol mode, signal NSRT (330) must be repeated periodically or the analog device 332 will time out and remove the insertion relay actuation voltage. This is a safety feature which removes a device from the Token Ring if there is a malfunction in the digital control circuitry (306). In the preferred embodiment of the present invention, this time-out feature is disabled by tying control signal WDTCAP (336) to +5 V so that no time-out occurs. As a result, in the preferred embodiment of the present invention, the NSRT input signal (331) on the TMS38053 (302) can be a DC signal. The relay actuation signals PHOUTA and PHOUTB (334) can then be controlled by a DC signal without time-out.

Continuing with FIG. 3, the FORCE signal 338, logical OR gate 340, and the two gated tri-state buffers (324, 344) are parts of the preferred embodiment of the present invention and would not be used in a normal Token Ring application of the Texas Instruments integrated circuits (302, 306). The FORCE signal 338 is driven to logical TRUE by the protocol analyzer circuitry (not shown) when the protocol analyzer needs to force insertion into a Token Ring. As will be discussed below, in the preferred embodiment, the FORCE signal 338 is asserted after the TMS380C16 (306) asserts the signal NSRT (330). Driving the signal FORCE (338) to logical TRUE forces logical OR gate 340 to continue to drive logical device 332 to maintain the relay actuation signals PHOUTA and PHOUTB (334) even if the TMS380C16 (306) tries to deactivate the relay actuation voltage by removing the NSRT signal (330). Driving FORCE (338) to logical TRUE also disables the first gated tri-state buffer 324, thereby preventing output signals DRVRF and ~DRVRF (322) from the TMS380C16 (306) from driving the signals to the network, DRVR and ~DRVR (346). When signal FORCE (338) is logical TRUE, an inverted FORCE signal (342) enables a second gated tri-state buffer 344 which loops received signal RCVR (316) back onto the output signal lines DRVR and ~DRVR (346), bypassing the TMS380C16 (306). Therefore, when signal FORCE (338) is logical TRUE, incoming network signals RCV and ~RCV (310) are repeated back onto the ring regardless of the state of the TMS380C16 (306).

When the protocol analyzer containing the circuitry illustrated in FIG. 3 needs to force insertion into a Token Ring, the protocol state machine in the TMS380C16 (306) is allowed to complete the normal initial sequence of steps illustrated by FIG. 1, steps 202-212. However, after the NSRT signal (FIG. 3, 330) is asserted to actuate the insertion relay, signal FORCE (FIG. 3, 338) is driven to logical TRUE by the protocol analyzer. The initial synchronization of the phase-locked-loop (FIG. 1, steps 202-206) is essential. As illustrated in FIG. 3, received signal RCVR (316) is clocked by RCLK (312), the output of the phase-locked-loop (304). If the phase-locked-loop is not permitted to go through the two step synchronization process (lock frequency, then switch to phase mode), the phase-locked-loop may stick at an extreme frequency range value and never synchronize. The preliminary synchronization to calibration data places the phase-locked-loop frequency within a range which permits synchronization to network data.

Figure 2:
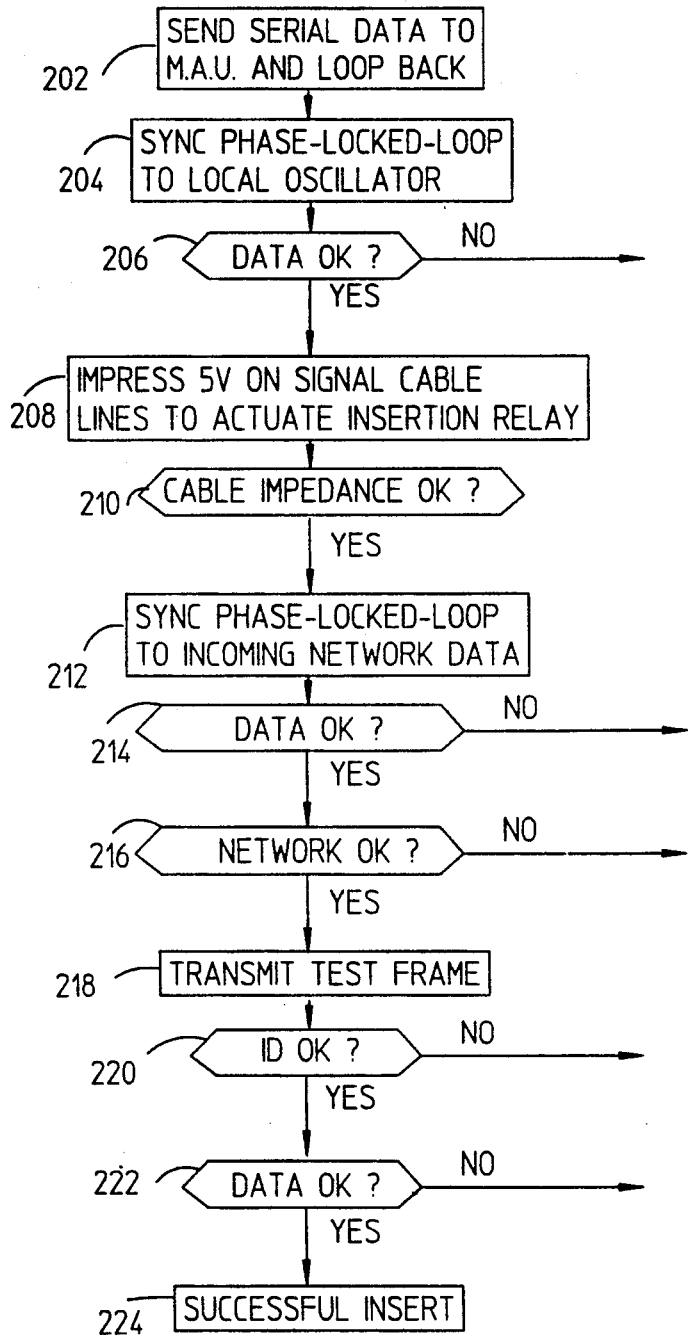
FIG. 2 is a prior art flow chart of steps which are typically performed by a computer before insertion into a Token Ring network.
Figure 4:
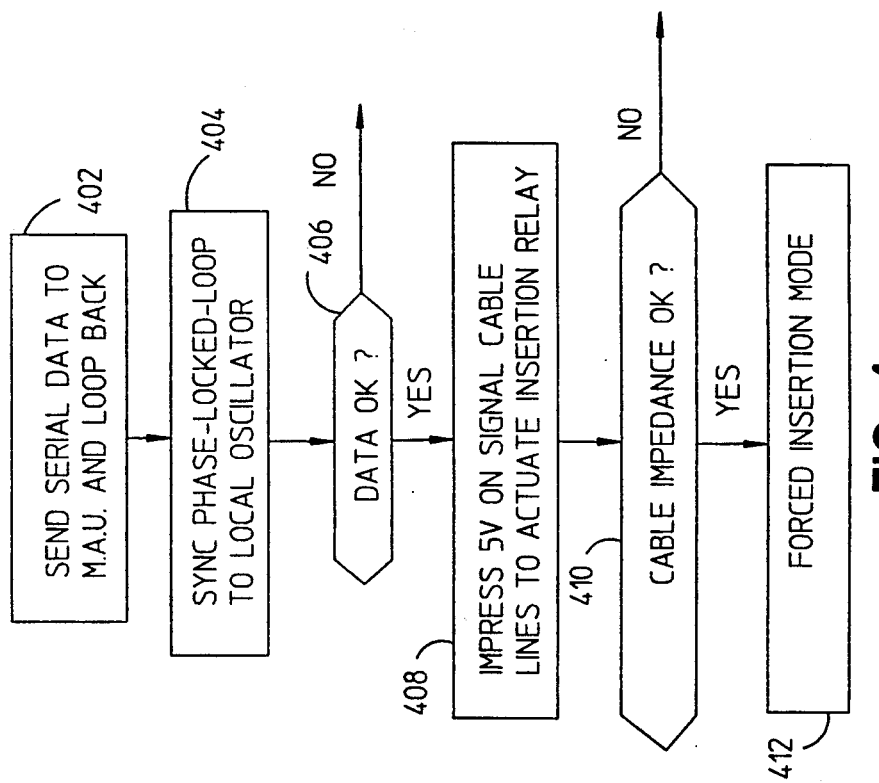
FIG. 4 is a flow chart illustrating steps performed by the present invention before forcing insertion into a Token Ring network.

FIG. 4 is a flow chart illustrating how the initial ring insertion steps illustrated in FIG. 2 are modified by the circuitry illustrated in FIG. 3 when the preferred embodiment of the protocol analyzer forces insertion into a Token Ring. FIG. 4, steps 402 through 410 are exactly the same as corresponding steps 202 through 210 in FIG. 2. However, at FIG. 4, step 412, the FORCE signal (FIG. 3, 338) is driven to logical TRUE and the circuitry illustrated in FIG. 3 then permits the network analyzer to be a passive network monitor. If tests 406 or 410 (FIG. 4) fail, there are internal problems with the network analyzer circuitry or the signal cable and these must be resolved before the analyzer can be used.

From the preceding discussion, it can be seen that an apparatus is described which enables a Token Ring network analyzer to use commercial integrated circuits for compatibility, but in a way which enables the analyzer to be forcibly inserted into a Token Ring, even when there is a network fault condition (e.g. beaconing) which would prohibit insertion if normal protocols were followed.

The foregoing description of the present invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A method performed by an adapter, for forcing insertion of an analyzer into a token ring network even when there are problems occurring in the network; wherein an insertion switch, controlled by an insertion switching signal, switches incoming data from the network to the analyzer and outgoing data from the analyzer to the network; wherein the analyzer incorporates a protocol processor which has a processor insertion output signal and a processor data output signal; the method comprising the following steps:

(a) switching the insertion switching signal to the processor insertion output signal;
    (b) inserting the analyzer into the network through the insertion switch by the processor insertion output signal;
    (c) forcing the analyzer to remain inserted into the network by switching the insertion switching signal from the processor insertion output signal to a force signal; and
    (d) switching the outgoing data to the network, from the processor data output signal to the incoming data from the network.

2. An adapter apparatus for forcing insertion of an analyzer into a token ring network even when there are problems occurring in the network, the adapter comprising:

an insertion switch, controlled by an insertion switching signal from the adapter, which switchably connects an incoming data signal from the network to the adapter and switchably connects an outgoing data signal from the adapter to the network, thereby inserting the adapter into the network;
    a protocol processor having a processor insertion output signal and a processor data output signal;
    first forcing means for switching the insertion switching signal from the processor insertion output signal to a force signal; and
    second forcing means for switching the outgoing data signal to the network, from the processor data output signal to the incoming data signal from the network.

* * * * *